(12) United States Patent
Dechgan et al.

(10) Patent No.: US 11,664,993 B2
(45) Date of Patent: May 30, 2023

(54) COMMUNICATING WITH A VEHICLE TRACKING DEVICE VIA SHORT MESSAGE SERVICE (SMS) SECURED BY SINGLE-USE CREDENTIALS

(71) Applicant: Spireon, Inc., Irvine, CA (US)

(72) Inventors: Sarodge Dechgan, Tustin, CA (US); Amir Kashani, Irvine, CA (US); Albert R. Beukman, Aliso Viejo, CA (US)

(73) Assignee: Spireon, Inc., Irvine, CA (US)

( * ) Notice: Subject to any disclaimer, the term of this patent is extended or adjusted under 35 U.S.C. 154(b) by 371 days.

(21) Appl. No.: 16/795,924

(22) Filed: Feb. 20, 2020

(65) Prior Publication Data

US 2020/0266990 A1    Aug. 20, 2020

Related U.S. Application Data

(60) Provisional application No. 62/808,051, filed on Feb. 20, 2019.

(51) Int. Cl.
| | | |
|---|---|---|
| *H04L 9/32* | (2006.01) | |
| *H04L 9/08* | (2006.01) | |
| *H04W 4/40* | (2018.01) | |
| *H04W 4/029* | (2018.01) | |
| *H04W 4/14* | (2009.01) | |

(52) U.S. Cl.
CPC .......... *H04L 9/3228* (2013.01); *H04L 9/0838* (2013.01); *H04L 9/0861* (2013.01); *H04L 9/0863* (2013.01); *H04W 4/029* (2018.02); *H04W 4/14* (2013.01); *H04W 4/40* (2018.02)

(58) Field of Classification Search
CPC ... H04L 9/3228; H04L 9/0838; H04L 9/0863; H04L 9/0861; H04W 4/029; H04W 4/40; H04W 4/14

See application file for complete search history.

(56) References Cited

U.S. PATENT DOCUMENTS

| | | |
|---|---|---|
| 7,366,551 B1 | 4/2008 | Hartley |
| 7,546,151 B2 | 6/2009 | Hartley |
| 8,626,208 B2 * | 1/2014 | Oesterling ............. H04W 4/14 340/901 |
| 9,332,404 B2 | 5/2016 | Boling et al. |
| 9,516,394 B2 | 12/2016 | Carlo et al. |
| 9,779,449 B2 * | 10/2017 | Meyer ................ G06Q 30/0645 |
| 9,894,493 B2 * | 2/2018 | Chun ......................... H04L 1/00 |
| 10,037,631 B2 * | 7/2018 | Berkobin ............... B60K 37/06 |
| 10,089,598 B2 | 10/2018 | Reeder et al. |
| 11,283,793 B2 * | 3/2022 | Khanna ................. H04L 9/3228 |
| 2002/0087704 A1 | 7/2002 | Chesnais et al. |
| 2005/0203892 A1 | 9/2005 | Wesley et al. |
| 2007/0050332 A1 | 3/2007 | Grenzberg et al. |
| 2008/0288768 A1 | 11/2008 | Barowski et al. |
| 2009/0112630 A1 | 4/2009 | Collins, Jr. et al. |

(Continued)

*Primary Examiner* — Gary S Gracia

(74) *Attorney, Agent, or Firm* — Luedeka Neely Group PC

(57) ABSTRACT

A system addresses a security vulnerability in sending commands to a vehicle tracking device via SMS text messaging. The system provides a single-use credential value for authenticating the SMS communication link before it can be used to command the vehicle tracking device. The single-use credential value, also referred to herein as a One-Time Personal Identification Number (OTPIN), is preferably time-based so that it can be used only once.

7 Claims, 5 Drawing Sheets

(56) References Cited

U.S. PATENT DOCUMENTS

| | | | |
|---|---|---|---|
| 2009/0167524 A1* | 7/2009 | Chesnutt | H04L 51/18 |
| | | | 340/539.19 |
| 2009/0287369 A1 | 11/2009 | Nielsen | |
| 2011/0227722 A1 | 9/2011 | Salvat | |
| 2014/0052607 A1* | 2/2014 | Park | G06Q 20/322 |
| | | | 705/38 |
| 2016/0048846 A1* | 2/2016 | Douglas | G06F 16/23 |
| | | | 705/318 |
| 2016/0096402 A1* | 4/2016 | Carlin | B60C 23/0479 |
| | | | 340/442 |
| 2016/0099927 A1* | 4/2016 | Oz | G07C 5/0808 |
| | | | 726/9 |
| 2016/0240050 A1* | 8/2016 | Block | G06Q 20/1085 |
| 2016/0294562 A1* | 10/2016 | Oberheide | H04L 9/0863 |
| 2017/0201515 A1* | 7/2017 | Clark | G06Q 20/40 |
| 2017/0364912 A1* | 12/2017 | Ross | G06Q 20/105 |
| 2018/0103036 A1* | 4/2018 | Fox | H04W 12/069 |
| 2018/0265038 A1* | 9/2018 | Lei | B60R 25/24 |
| 2018/0302223 A1* | 10/2018 | Benson | H04L 9/3234 |
| 2018/0302228 A1* | 10/2018 | Hergesheimer | H04L 9/321 |
| 2018/0310174 A1* | 10/2018 | Rougier | H04W 12/04 |
| 2018/0338241 A1* | 11/2018 | Li | H04M 3/42008 |
| 2019/0013945 A1* | 1/2019 | Hamlin | G06F 11/0709 |
| 2019/0036914 A1* | 1/2019 | Tzur-David | H04L 63/0846 |
| 2019/0036915 A1* | 1/2019 | Burch | H04L 63/0846 |
| 2019/0043281 A1* | 2/2019 | Aman | H04W 4/029 |
| 2019/0097804 A1* | 3/2019 | Parikh | H04L 9/0872 |
| 2019/0297075 A1* | 9/2019 | Kaladgi | G06F 21/34 |
| 2020/0050442 A1* | 2/2020 | Sakurai | H04L 67/12 |
| 2020/0151744 A1* | 5/2020 | Chopra | G06Q 30/0202 |
| 2020/0186560 A1* | 6/2020 | Ben-Noon | H04L 63/123 |
| 2020/0266990 A1* | 8/2020 | Dechgan | H04W 12/06 |
| 2021/0061223 A1* | 3/2021 | Fuke | H04L 63/0838 |
| 2021/0234850 A1* | 7/2021 | Vogt | H04W 12/06 |
| 2021/0287500 A1* | 9/2021 | Conlon | G06F 1/3278 |
| 2022/0166766 A1* | 5/2022 | Madjitey, Jr. | H04L 63/0838 |

\* cited by examiner

COMMUNICATING WITH A VEHICLE TRACKING DEVICE VIA SHORT MESSAGE SERVICE (SMS) SECURED BY SINGLE-USE CREDENTIALS

RELATED APPLICATIONS

This application claims priority to U.S. provisional patent application Ser. No. 62/808,051, filed Feb. 20, 2019, titled One-Time Personal Identification Number (PIN) for Secured Short Message Service (SMS) Communications, the entire contents of which are incorporated herein by reference.

FIELD

This invention relates to the field of vehicle tracking devices. More particularly, this invention relates to a system for communicating with a vehicle tracking device using a secured Short Message Service communication protocol.

BACKGROUND

Typical automotive tracking devices include a GPS receiver and a cellular modem module. Communications with such tracking devices can be through a backend server via a data connection or via a Short Message Service (SMS) message. SMS is a text messaging service that uses standardized communication protocols to allow mobile devices to exchange relatively short (no more than 160 characters) alphanumeric text messages.

When a wireless data connection is used for communicating with a tracking device, standard and well known methods of authenticating the data can be used. However, there are some remote locations in which wireless data connections are not available, but SMS is available. SMS is often used to command a tracking device to perform a critical action when a wireless data connection is not available, such as setting up cellular connections and commanding a firmware update.

Currently, the only secure aspect of an SMS communication is the requirement of knowledge of the unique phone number of the cellular modem in the tracking device. However, if that phone number is known to a hacker, a message can be sent to a tracking device via a phone or a computer to command the device to perform some unwanted action. This is a significant security vulnerability.

What is needed, therefore, is a system for securely communicating with a vehicle tracking device using the SMS protocol.

SUMMARY

To resolve security vulnerabilities, embodiments described herein provide a single-use credential value for authenticating an SMS communication link before it can be used to command a vehicle tracking device. The single-use credential value is also referred to herein as a One-Time Personal Identification Number (OTPIN). The OTPIN is preferably time-based so that it can be used only once, similar to techniques described in the Request for Comments (RFC) 6238 promulgated by the Internet Engineering Task Force (IETF). In a preferred embodiment, a shared key "K" is set up in the tracking device and the backend server before the tracking device is put into service. When the backend server wishes to contact the tracking device, it must use the OTPIN to authenticate itself. This can be done in one of several ways, as described hereinafter.

A first embodiment described herein is directed to a method for providing secure communications between a backend server and a vehicle tracking device. This first embodiment includes steps of:
 (a) generating a command message including a command to be executed by the vehicle tracking device;
 (b) generating a single-use credential value based at least in part on a shared key value and a first time value, wherein the single-use credential value is valid only during a first time window having a duration of X seconds, and wherein the first time value falls within the first time window;
 (c) attaching the single-use credential value to the command message;
 (d) sending the command message from the backend server to the vehicle tracking device via a wireless communication network;
 (e) receiving the command message at the vehicle tracking device;
 (f) a processor of the vehicle tracking device generating a first expected credential value based at least in part on the shared key value and a second time value;
 (g) the processor of the vehicle tracking device comparing the first expected credential value to the single-use credential value attached to the command message; and
 (h) the vehicle tracking device executing the command included in the command message only if the first expected credential value matches the single-use credential value attached to the command message.

In some embodiments, the first expected credential value matches the single-use credential value only if the second time value falls within the first time window.

In some embodiments, if the first expected credential value does not match the single-use credential value, the method further comprises:
 (f1) the processor of the vehicle tracking device generating a second expected credential value based at least in part on the shared key value and a time value that falls within a preceding time window that immediately precedes a time window into which the second time value falls;
 (g1) the processor of the vehicle tracking device comparing the second expected credential value to the single-use credential value attached to the command message; and
 (h1) the vehicle tracking device executing the command included in the command message only if the second expected credential value matches the single-use credential value attached to the command message.

In some embodiments, the preceding time window corresponds to the first time window.

In some embodiments, the second time value corresponds to a time at which the command message is received at the vehicle tracking device.

In some embodiments, the time at which the command message is received at the vehicle tracking device is determined based on reference to timing signals from Global Positioning System (GPS) satellites.

A second embodiment described herein includes steps of:
 (a) generating a command message including a command to be executed by the vehicle tracking device;
 (b) generating a single-use credential value based at least in part on a shared key value and a first time value, wherein the single-use credential value is valid only during a first time window having a duration of X seconds, and wherein the first time value falls within the first time window;

(c) attaching the single-use credential value to the command message;
(d) attaching a timestamp value to the command message, wherein the timestamp value corresponds to the first time value;
(e) sending the command message from the backend server to the vehicle tracking device via a wireless communication network;
(f) receiving the command message at the vehicle tracking device;
(g) a processor of the vehicle tracking device generating an expected credential value based at least in part on the shared key value and the timestamp value attached to the command message;
(h) the processor of the vehicle tracking device comparing the expected credential value to the single-use credential value attached to the command message; and
(i) the vehicle tracking device executing the command included in the command message only if the expected credential value matches the single-use credential value attached to the command message.

A third embodiment described herein includes steps of:
(a) generating a command message including a command to be executed by the vehicle tracking device;
(b) generating a single-use credential value based at least in part on a shared key value and a first time value, wherein the single-use credential value is valid only during a first time window having a duration of X seconds, and wherein the first time value falls within the first time window;
(c) encrypting the command message using the single-use credential value as an encryption key;
(d) sending the command message from the backend server to the vehicle tracking device via a wireless communication network;
(e) receiving the command message at the vehicle tracking device;
(f) a processor of the vehicle tracking device generating an expected credential value based at least in part on the shared key value and a second time value;
(g) the processor of the vehicle tracking device decrypting the command message using the expected credential value as a decryption key; and
(h) the vehicle tracking device executing the command included in the command message.

In some embodiments, the processor of the vehicle tracking device is able to decrypt the command message only if the expected credential value matches the single-use credential value attached to the command message.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
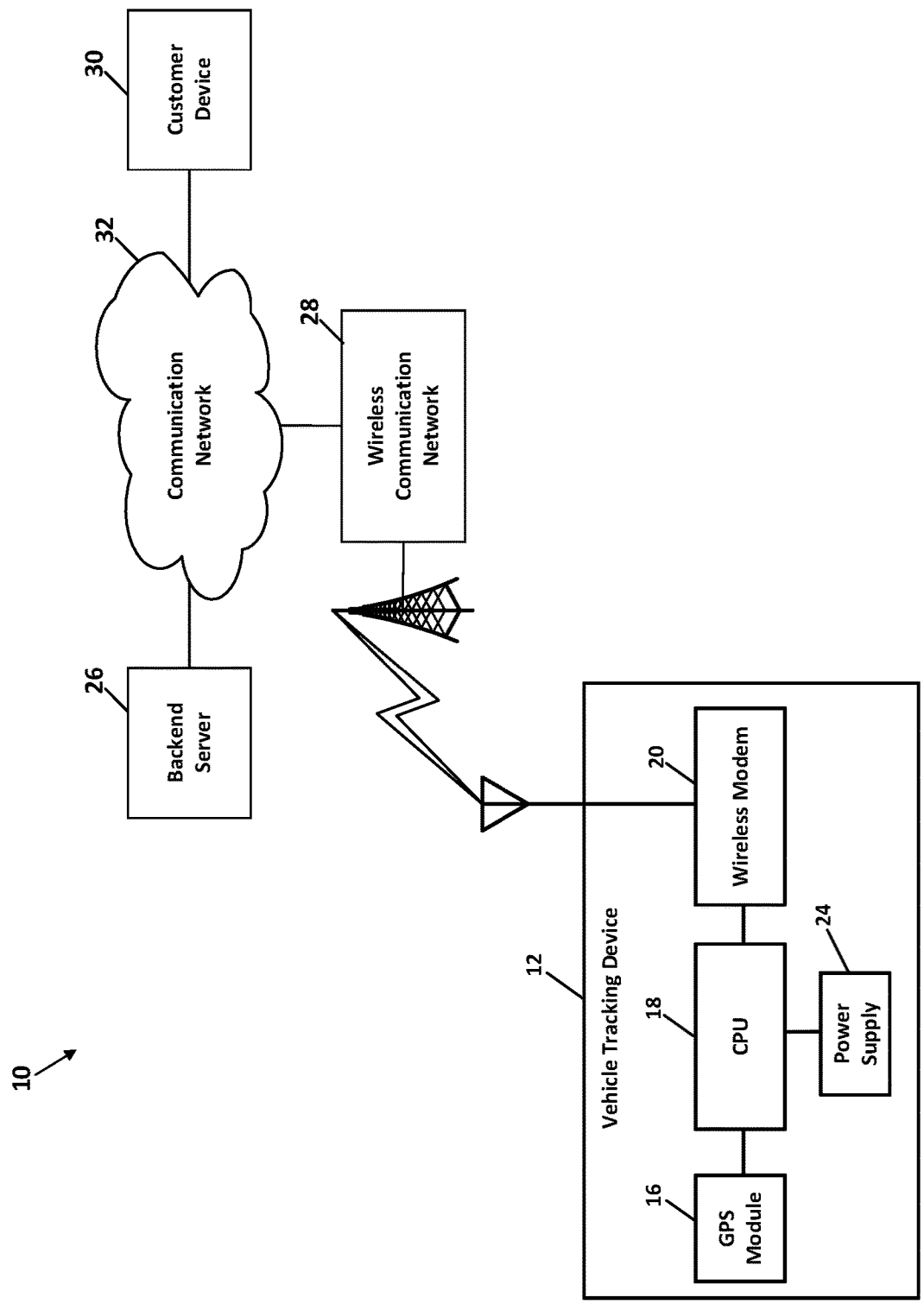
FIG. 1 depicts a vehicle tracking device in communication with a backend server according to an embodiment of the invention.

As shown in FIG. 1, a communication system 10 includes a vehicle tracking device 12, which may be installed in a vehicle. The vehicle tracking device 12 communicates with a service provider's backend server 26 via a wireless communication network 28, such as a cellular network or Wi-Fi network, and a wide area communication network 32, such as the Internet. The backend server 26 is also operable to communicate with a customer device 30 via the network 32 or the network 28. The customer device 30 may be a computer, a tablet, or a smartphone through which a customer entity receives communications from the service provider. The customer entity may be a subscriber to asset tracking and monitoring services provided by the service provider.

A preferred embodiment of the vehicle tracking device 12 includes a Global Positioning System (GPS) module 16, a central processing unit (CPU) 18, a wireless modem 20, and a power supply 24. The GPS module 16 determines location coordinates of the vehicle tracking device 12 based on timing signals received from GPS satellites. These location coordinates may be communicated to the CPU 18 for storage in associated memory or to the wireless modem 20 to be transmitted to the backend server 26 of the monitoring service provider. In some embodiments, the location of the vehicle tracking device 12 may be determined based on the presence of a given Wi-Fi network or a particular cellular tower detected by the wireless modem 20.

The CPU 18 of the vehicle tracking device 12 executes instructions to make decisions and direct communications between the vehicle tracking device 12 and the backend server 26. In preferred embodiments, memory associated with the CPU 18 stores a unique identification/serial number (such as cellular telephone number) assigned to the vehicle tracking device 12.

The wireless modem 20 of the vehicle tracking device 12 comprises a wireless RF transceiver, such as cellular modem, a satellite modem and/or a Wi-Fi modem, for providing two-way wireless communications between the vehicle tracking device 12 and the backend server 26.

The vehicle tracking device 12 includes a power supply 24 that may receive and condition power from the vehicle power supply when the device 12 is connected to the vehicle's OBD bus. The power supply 24 may include a backup battery for providing power to the vehicle tracking device 12 when no power is being provided by the vehicle power supply.

Figure 2:
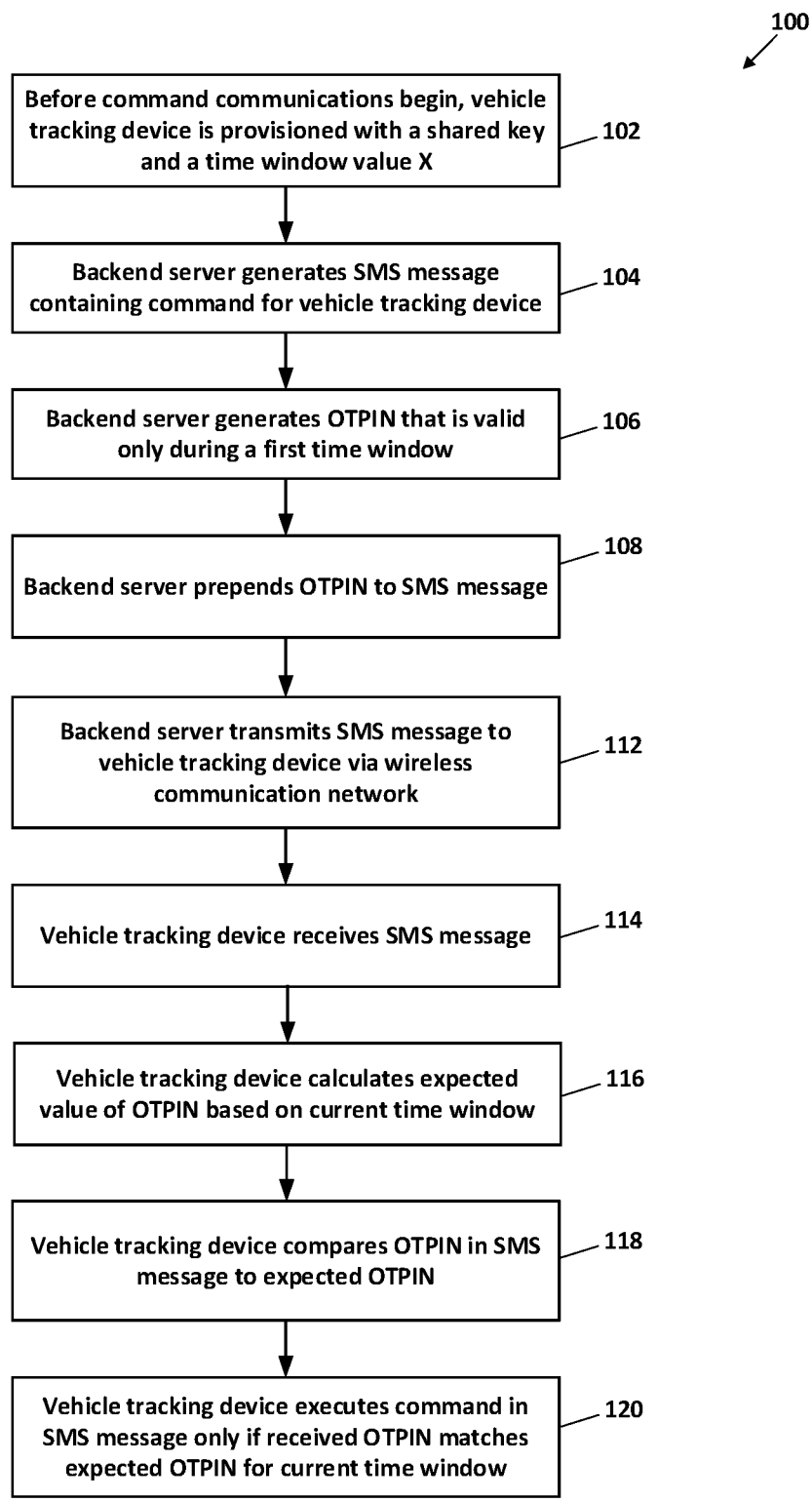
FIG. 2 depicts a method for communicating messages to the vehicle tracking device from the backend server according to an embodiment of the invention.

FIG. 2 depicts steps of one preferred method 100 for communicating an SMS message from the backend server 26 to the vehicle tracking device 12. Prior to any wireless command communications between the backend server 26 and the vehicle tracking device 12, a provisioning process is performed in which at least two values are stored in the memory of the CPU 18 of the tracking device 12 to be used in the One-Time Personal Identification Number (OTPIN) authentication process (step 102). These values, which are discussed in more detail hereinafter, include a shared key K and a time window value X. The provisioning process is typically performed before the vehicle tracking device 12 is installed in a vehicle, and may be accomplished via a secure Wi-Fi or wired network connection.

After the vehicle tracking device 12 has been installed in a vehicle, the backend server 26 generates an SMS message that includes a command to be executed by the vehicle tracking device 12 (step 104), such as a command to acquire and transmit its current GPS coordinates. Using the shared key and a first time value corresponding to the current time, the backend server 26 also generates the OTPIN (step 106). In a preferred embodiment, the first time value identifies a specific time window referenced to standard UNIX time, also referred to herein as the first time window. Preferably, the OTPIN is valid only during this first time window after its generation. For example, the width of the first time window may be specified by the value X, which in a preferred embodiment is 30 seconds. The first time window has a begin time TO that is preferably referenced to the current UNIX time. The backend server 26 prepends the OTPIN to the SMS message (step 108), and transmits the SMS message via the communication networks 32 and 28 to the vehicle tracking device 12 (step 112).

Upon receipt of the SMS message (step 114), the CPU 18 of the vehicle tracking device 12 calculates an expected value of the OTPIN based on the shared key and a second time value corresponding to a second time window during which the vehicle tracking device 12 received the SMS message (step 116). The CPU 18 compares the expected value of the OTPIN to the OTPIN appended to the SMS message (step 118). If the expected value of the OTPIN matches the OTPIN appended to the SMS message, the vehicle tracking device 12 executes the command included in the SMS message (step 120).

Figure 3:
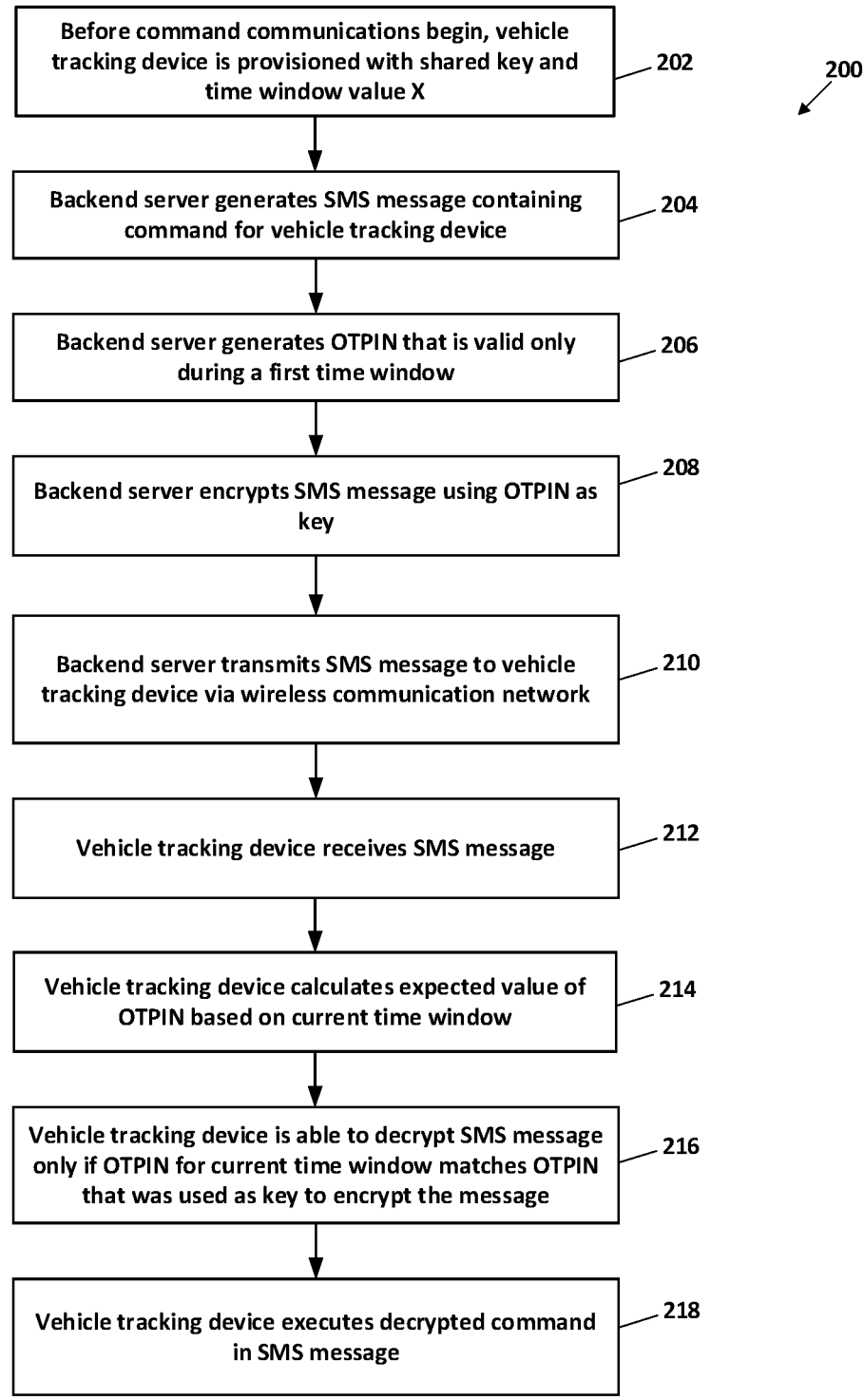
FIG. 3 depicts a method for communicating messages to the vehicle tracking device from the backend server according to an alternative embodiment of the invention.

An alternative embodiment implements the process depicted in FIG. 3. Steps 202 through 206 of this embodiment are generally the same as steps 102 through 106 of the embodiment of FIG. 2. However, in the process of FIG. 3, instead of prepending the OTPIN to the SMS message, the backend server 26 encrypts the SMS message using the OTPIN as the encryption key (step 208). The backend server 26 then transmits the encrypted SMS message via the communication networks 32 and 28 to the vehicle tracking device 12 (step 210). Upon receipt of the SMS message (step 212), the CPU 18 of the vehicle tracking device 12 calculates an expected value of the OTPIN based on the shared key and the second time value corresponding to the time window during which the vehicle tracking device 12 received the SMS message (step 214). The CPU 18 can decrypt the encrypted SMS message using the expected OTPIN only if the expected OTPIN matches the OTPIN that was used by the backend server 26 to encrypt the SMS message (step 216). If the SMS message is successfully decrypted, then the vehicle tracking device 12 executes the decrypted command (step 218). While providing the advantage of an encrypted message, this embodiment also requires no messaging overhead. Given the 140-byte limit of legacy SMS messages, this embodiment provides a significant advantage.

It should be noted that the OTPIN prepended to the SMS message is valid only for the duration of the first time window defined by the value X (such as 30 seconds) that began at the time TO at which the OTPIN was generated. Due to latency issues, by the time the SMS message is received at the vehicle tracking device 12, the first time window during which the OTPIN is valid may have expired. Timing errors can also occur due to clock drift in the GPS module 16 of the vehicle tracking device 12 if it is unable to acquire GPS timing signals due to loss of communication with the GPS satellites. In such situations, the expected value of the OTPIN may have been calculated by the CPU 18 during a time window subsequent to the first time window in which the OTPIN prepended to the SMS message was calculated, and the expected OTPIN will therefore not match the received OTPIN.

Figure 4:
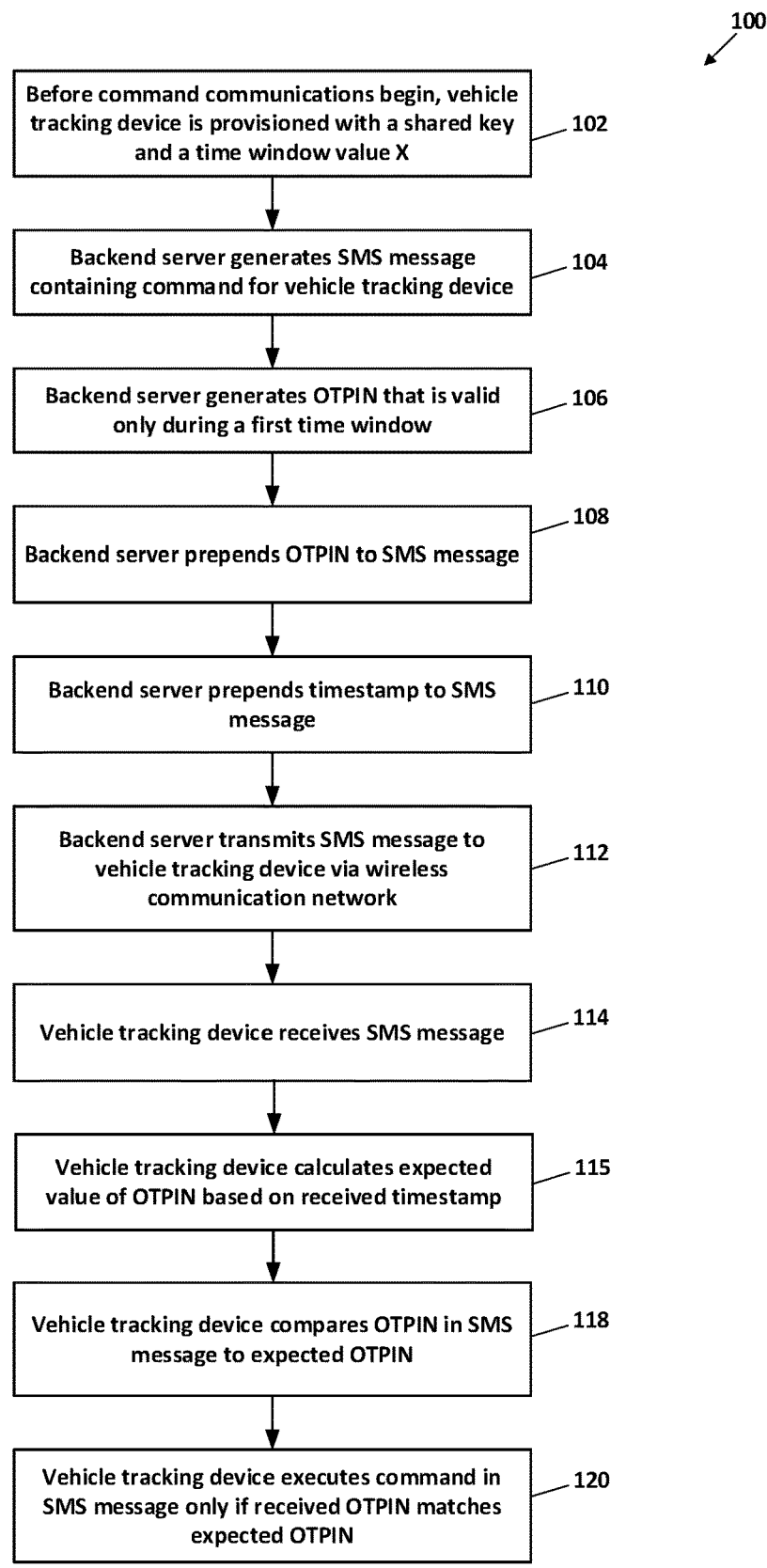
FIG. 4 depicts a method for communicating messages to the vehicle tracking device from the backend server according to an alternative embodiment of the invention.

As depicted in FIG. 4, some embodiments address the latency issue by also prepending a timestamp to the SMS message (step 110). The timestamp corresponds to the time TO at which the prepended OTPIN value was calculated at the backend server 26. The CPU 18 of the vehicle tracking device 12 then uses the timestamp value in calculating the expected OTPIN instead of using the time value corresponding to the time at which the SMS message was received by the vehicle tracking device 12 (step 115).

It should be noted that the embodiment of FIG. 4 differs from time-based one-time password (TOTP) techniques described in RFC6238. In contrast to the embodiment of FIG. 4, TOTP uses a Unix timestamp as one of several seed values for an encryption hash, but the timestamp is not transmitted openly in the message. In the embodiment of FIG. 4, the timestamp is transmitted openly in the message.

Figure 5:
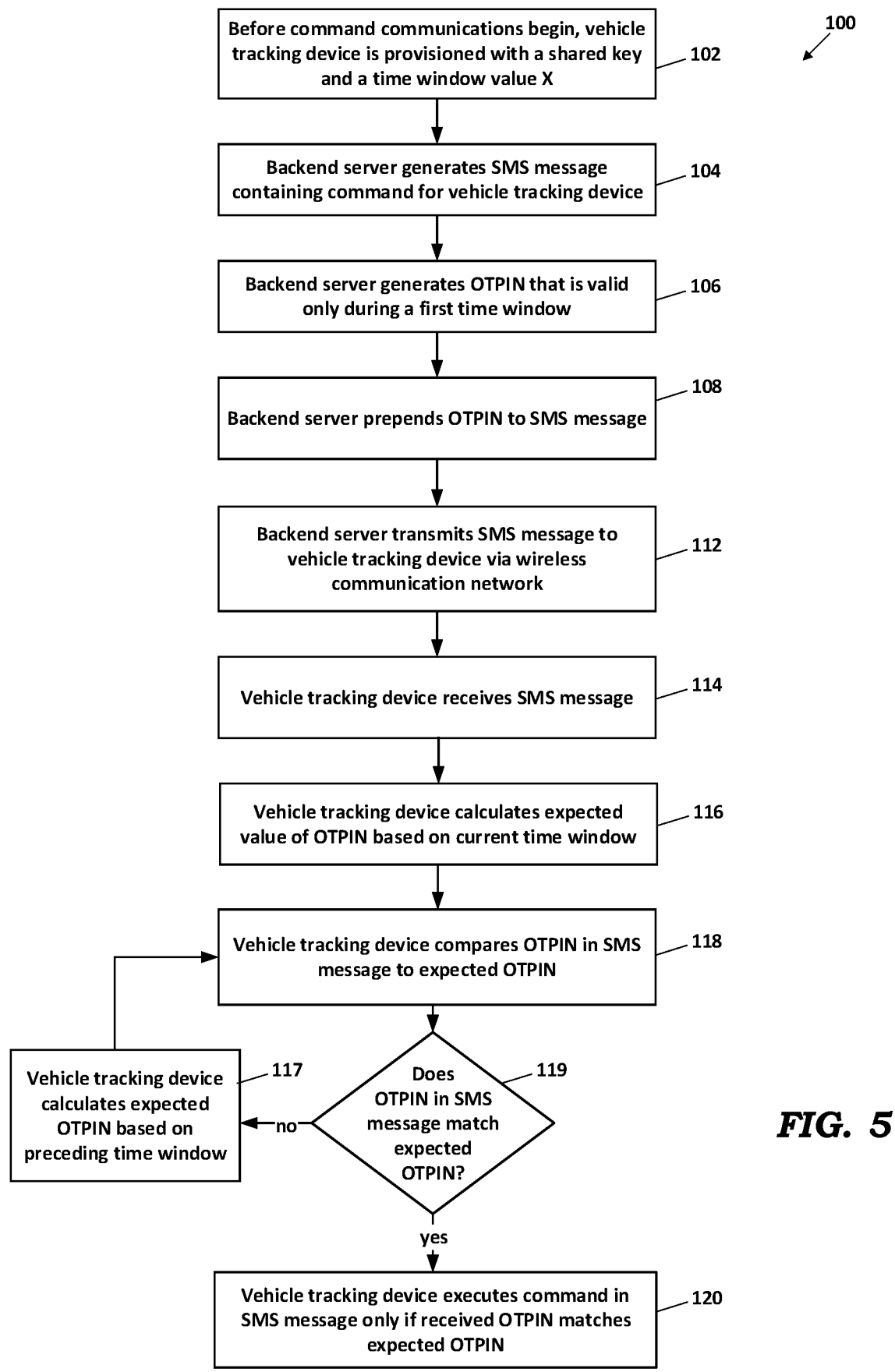
FIG. 5 depicts a method for communicating messages to the vehicle tracking device from the backend server according to an alternative embodiment of the invention.

As depicted in FIG. 5, other embodiments address the latency issue by effectively lengthening the time period during which the prepended OTPIN value is valid. In these embodiments, if the expected OTPIN calculated as described above does not match the OTPIN value prepended to the SMS message (step 119), the CPU 18 calculates the expected value of the OTPIN based on the shared key and a time value corresponding to a 30-second-wide time window that preceded the window in which the vehicle tracking device 12 received the SMS message (step 117). The number of time windows included in this "looking back" process may be programmed to no more than one or two windows (such as 60 or 90 seconds), as providing validity to older OTPIN values may significantly impact security vulnerabilities. In other words, lengthening the time that an OTPIN value is valid gives hackers more time to access and use an old value OTPIN to cause the vehicle tracking device 12 to act on an unwanted command. It will be appreciated that the time windows may have widths other than 30 seconds, as specified by the provisioned value X.

Some embodiments may be implemented using a separate library in the vehicle tracking device 12, allowing for integration into third party systems without revealing the method by which the SMS message is encrypted. A library may be created which has the functions of:

EncryptedMessage=EncryptMessage(SMSClearTextMessageToSend)
    DecryptedMessage=DecryptMessage(SMSEncryptedMessageReceived)
    StoreSharedKey(SharedKey)

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for providing secure communications between a backend server and a vehicle tracking device, comprising:
   (a) generating a Short Message Service (SMS) command message including a command to be executed by the vehicle tracking device;
   (b) generating a single-use credential value based at least in part on a shared key value and a first time value corresponding to a time at which the SMS command message is generated, wherein the first time value falls within a first time window having a limited duration;
   (c) attaching the single-use credential value to the SMS command message;
   (d) sending the SMS command message from the backend server to the vehicle tracking device via a wireless communication network;
   (e) receiving the SMS command message at the vehicle tracking device;
   (f) a processor of the vehicle tracking device generating a first expected credential value based at least in part on the shared key value and a second time value that corresponds to a time at which the SMS command message is received at the vehicle tracking device;
   (g) the processor of the vehicle tracking device comparing the first expected credential value to the single-use credential value attached to the SMS command message;
   (h) the vehicle tracking device executing the command included in the SMS command message based on the first expected credential value matching the single-use credential value attached to the SMS command message, wherein the first expected credential value matching the single-use credential value is conditioned upon the second time value falling within the first time window; and
   (i) based on the first expected credential value not matching the single-use credential value because the second time value falls into a second time window that is subsequent to the first time window:
      the processor of the vehicle tracking device generating a second expected credential value based at least in part on the shared key value and a third time value that falls within a preceding time window that immediately precedes the second time window;
      the processor of the vehicle tracking device comparing the second expected credential value to the single-use credential value; and
      the vehicle tracking device executing the command included in the SMS command message based on the second expected credential value matching the single-use credential value attached to the SMS command message, wherein the second expected credential value matching the single-use credential value is conditioned upon the first time value falling within the preceding time window.

2. The method of claim 1 wherein the preceding time window corresponds to the first time window.

3. The method of claim 1 wherein the time at which the SMS command message is received at the vehicle tracking device is determined based on reference to timing signals from Global Positioning System (GPS) satellites.

4. The method of claim 1 wherein step (c) comprises prepending the single-use credential value to the SMS command message.

5. The method of claim 1 wherein the command included in the SMS command message causes the vehicle tracking device to perform one or more of:
   setting up cellular communications;
   performing a firmware update; and
   acquiring and transmitting its current GPS coordinates.

6. A method for providing secure communications between a backend server and a vehicle tracking device, comprising:
   (a) generating a Short Message Service (SMS) command message including a command to be executed by the vehicle tracking device;
   (b) generating a single-use credential value based at least in part on a shared key value and a first time value, wherein the single-use credential value is valid only during a first time window having a limited duration, and wherein the first time value falls within the first time window;
   (c) attaching the single-use credential value to the SMS command message;
   (d) attaching a timestamp value to the SMS command message, wherein the timestamp value corresponds to the first time value;
   (e) sending the SMS command message from the backend server to the vehicle tracking device via a wireless communication network;
   (f) receiving the SMS command message at the vehicle tracking device;
   (g) a processor of the vehicle tracking device generating an expected credential value based at least in part on the shared key value and the timestamp value attached to the SMS command message;
   (h) the processor of the vehicle tracking device comparing the expected credential value to the single-use credential value attached to the SMS command message; and
   (i) the vehicle tracking device executing the command included in the SMS command message based on the expected credential value matching the single-use credential value attached to the SMS command message.

7. The method of claim 6 wherein the command included in the SMS command message causes the vehicle tracking device to perform one or more of:
   setting up cellular communications;
   performing a firmware update; and
   acquiring and transmitting its current GPS coordinates.

* * * * *